United States Patent [19]

Flood et al.

[11] Patent Number: 5,777,874

[45] Date of Patent: Jul. 7, 1998

[54] PROGRAMMABLE CONTROLLER BACKUP SYSTEM

[75] Inventors: Mark A. Flood, Mayfield Heights; Bradley J. Bittorf, Novelty; William B. Cook, Northfield Center; D. Alan Graham, Mentor; Robert D. Law, Independence; David E. Mohnke, Willoughby; Robert R. Sepsi, Richmond Heights; Jack F. Toma, Willoughby Hills, all of Ohio

[73] Assignee: Allen-Bradley Company, Inc., Milwaukee, Wis.

[21] Appl. No.: 599,843

[22] Filed: Feb. 12, 1996

[51] Int. Cl.$^6$ .............................. G06F 11/16; G06F 11/20
[52] U.S. Cl. .................. 364/187; 364/184; 364/191; 364/194; 364/943.91; 395/182.11; 395/182.1; 395/182.08; 395/182.09; 395/841; 711/162
[58] Field of Search ....................... 364/187, 184, 364/940.61, 941.2, 937, 942.04, 943.91, 943.92, 944.2, 966.5, 131, 191, 194; 395/182.11, 182.04, 182.09, 183.17, 841, 840, 200.12, 200.11, 182.1, 182.02, 182.08, 183.18, 200.54, 57, 200.42, 200.78; 711/162

[56] References Cited

U.S. PATENT DOCUMENTS

| | | | |
|---|---|---|---|
| 4,872,106 | 10/1989 | Slater | 395/182.11 |
| 4,876,664 | 10/1989 | Bittorf et al. | 364/131 |
| 5,157,663 | 10/1992 | Major et al. | 395/182.08 |
| 5,193,189 | 3/1993 | Flood et al. | 395/673 |
| 5,212,784 | 5/1993 | Sparkis | 395/182.04 |
| 5,225,974 | 7/1993 | Mathews et al. | 364/140 |
| 5,265,005 | 11/1993 | Schmidt et al. | 364/147 |
| 5,307,463 | 4/1994 | Hyatt et al. | 395/821 |
| 5,311,508 | 5/1994 | Buda et al. | 370/476 |
| 5,313,386 | 5/1994 | Cook et al. | 364/187 |
| 5,392,424 | 2/1995 | Cook | 395/185.05 |
| 5,455,932 | 10/1995 | Major et al. | 395/489 |

*Primary Examiner*—Emanuel T. Voeltz
*Assistant Examiner*—Tuan Q. Dam
*Attorney, Agent, or Firm*—John M. Miller; John J. Horn

[57] ABSTRACT

The present invention constitutes a data crossloading system for use with a programmable controller system having primary and secondary (or "back-up") systems each of which have redundant hardware components and have data structures associated with these components. The present invention further relates to the interconnection of the hardware components and to the processes for providing redundant data structures which enable a secondary or back-up system to rapidly and effectively assume control when a malfunction occurs in a primary control system. Both systems are connected via the same remote data links to common I/O racks which interface to sensing and output devices on the equipment being controlled.

Data structure information in the primary system is specially crossloaded to the secondary system so that when a malfunction occurs that shuts down the primary system, the secondary system can begin execution of the same control programs and input and output the same data to the same I/O racks based on up to date data from the primary system. The crossloading of the data is accomplished through the use of special backup modules in both the primary and secondary (backup) control systems connected by a high speed communications link. Communications take place through the use of program utilities which establish a tightly coupled communications network between the primary and secondary systems. Additionally, on-line editing is enabled in stages so that when either control system can not properly execute the edit it is rejected. This system insures that edits can not take place in the primary system without being concurrently implemented in the secondary system.

12 Claims, 7 Drawing Sheets

# PROGRAMMABLE CONTROLLER BACKUP SYSTEM

FIELD OF THE INVENTION

The present invention relates to industrial automation equipment and in general to programmable controller systems such as the system shown in U.S. Pat. No. 4,937,777 issued to Flood et al. which is incorporated herein by reference. More particularly, this invention relates to programmable controller systems having backup capabilities.

BACKGROUND OF THE INVENTION

Programmable controllers are typically connected to industrial equipment such as machine tools on manufacturing assembly lines to sequentially operate the equipment in accordance with a stored program. In most programmable controllers the control program is stored in a memory and includes sets of instructions which are rapidly read in sequence to examine the condition of selected sensing devices on the controlled equipment and to energize or de-energize selected operating devices on the controlled equipment contingent upon the status of inputs from one or more of the examined sensing devices.

There are many applications for programmable controllers in which the "down time" resulting from malfunctions in the controller must be kept to a minimum. For example, the cost of shutting down a converter in a steel mill or an automotive assembly line is enormous, and special measures must be taken to insure that quality components are employed in their control systems. Despite such efforts, it is statistically certain that malfunctions will eventually occur in key control components.

In control systems which employ relays and discrete logic circuits, individual components which malfunction can be easily and quickly replaced. Often such replacement can be accomplished without shutting down the entire system, since the discrete component performs a specific function that affects a limited portion of the system. However, it is an inherent characteristic of programmable controllers that the decision making functions of the system are concentrated in certain essential components. For example, a malfunction in the memory which stores the control program or a malfunction in the processor which reads and executes the control program instructions can be catastrophic since the entire system being controlled is likely to be affected. Malfunction detection techniques may be employed to sense and quickly diagnose such problems. However, even if the malfunction can be quickly discovered, diagnosed and fixed, the resetting and power-up of the system requires a considerable amount of time.

The use of redundant components is common practice in a number of fields. In the aerospace field, for example, there may be multiple redundancy of entire flight control systems and in the data processing field it is common to provide redundant processors or input/output controllers. However, in the industrial control field mere hardware redundancy is inadequate since the data structures stored in system memory which govern the operation of the system are dynamic in content in accordance with process conditions and are not duplicated in up to date form in a backup system.

SUMMARY OF THE INVENTION

The present invention constitutes a data crossloading system for use with a programmable controller system having primary and secondary (or "back-up") systems each of which have redundant hardware components and have data structures associated with these components. The present invention further relates to the interconnection of the hardware components and to the processes for providing redundant data structures which enable a secondary or back-up system to rapidly and effectively assume control when a malfunction occurs in a primary control system. Both the primary and secondary systems include computer memory in their system modules which is used for storing control programs, support files, various data tables and the like. Both systems are connected via the same remote data links to common I/O racks which interface to sensing and output devices on the equipment being controlled. Processors and scanners on the primary system are operable to execute control programs to input process status data from the I/O racks and to output process control data to the I/O racks.

Data structure information in the primary system is specially crossloaded to the secondary system so that when a malfunction occurs that shuts down the primary system, the secondary system can begin execution of the same control programs and input and output the same data to the same I/O racks based on up to date data from the primary system. The crossloading of the data is accomplished through the use of special backup modules in both the primary and secondary (backup) control systems connected by a high speed communications link. Communications take place through the use of program utilities which establish a tightly coupled communications network between the primary and secondary systems. A high degree of synchronization of program data is assured by the synchronous crossloading of selected control program data on a high priority basis with such data transmissions being acknowledged. Similarly, I/O Data is crossloaded periodically on a priority basis between primary and secondary system. Active I/O Input data is also received by the secondary system by listening to the serial data on the I/O network. On-line editing is enabled in stages so that when either control system can not properly execute the edit it is rejected. This system insures that edits can not take place in the primary system without being concurrently implemented in the secondary system.

A general object of the invention is to provide backup for those portions of a programmable controller system which affect the entire system being controlled. The present invention provides redundancy of crucial data structure elements including time critical data without costly duplication of the I/O rack hardware.

Another object of the invention is to allow a rapid and "bumpless" transfer of control from a primary system to a secondary (backup) system when a malfunction occurs. This is primarily accomplished by a high speed data link between the two systems which is operable to rapidly crossroad data structures from the primary system to the secondary system on a prioritized basis. It is also accomplished by arranging online editing which takes place concurrently in both systems. Thus, when and if a secondary system assumes control, it contains an accurate and up to date data structure with which to operate.

The foregoing and other objects and advantages of the present invention will become apparent from the following description of the preferred embodiment. Such embodiment does not necessarily represent the full scope of the invention and reference is made to the claims for interpreting the breadth of the invention.

DESCRIPTION OF THE PREFERRED EMBODIMENT

Overall System Structure

Figure 1:
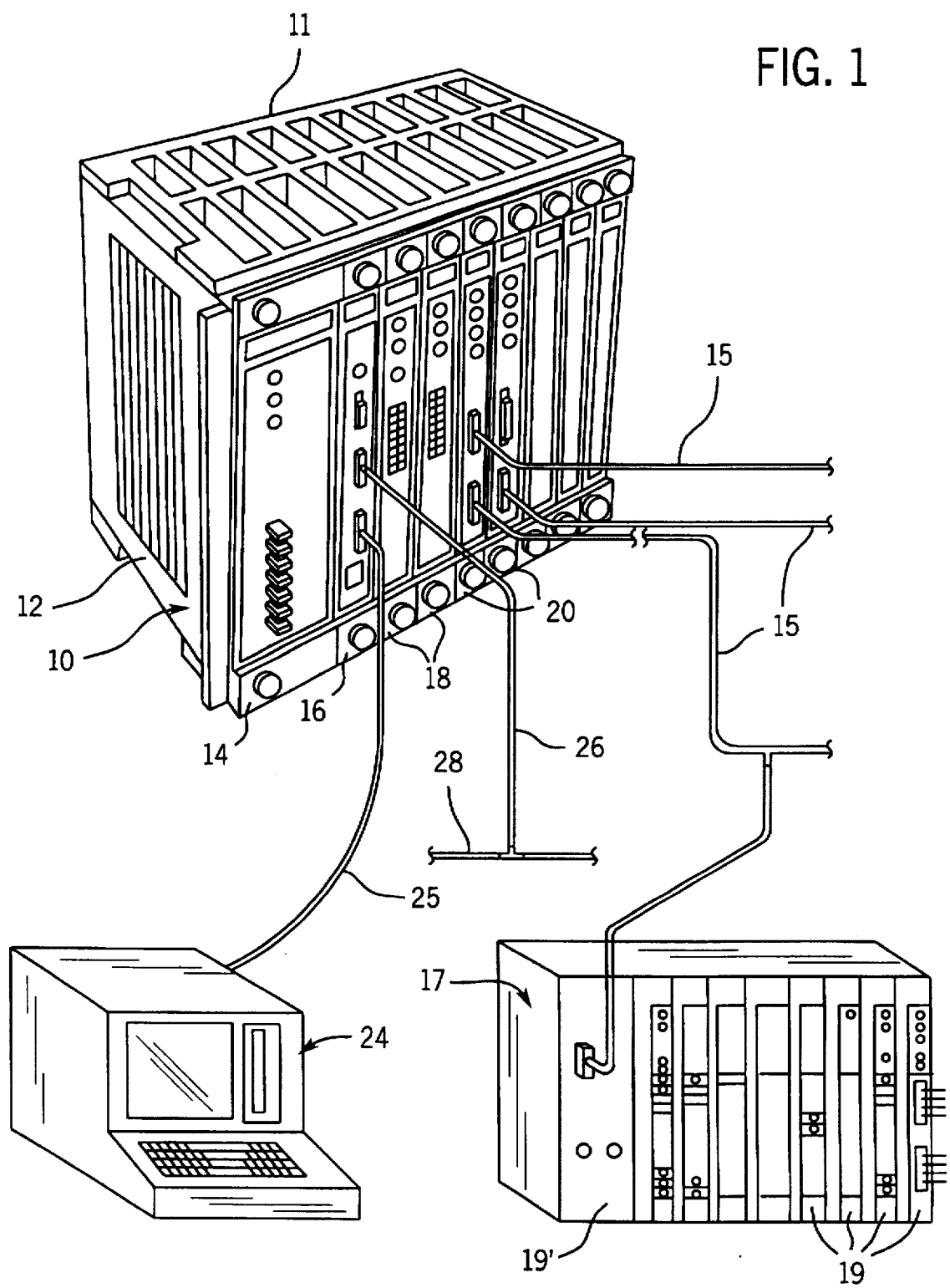
FIG. 1 provides a diagrammatic elevated perspective view of a single overall programmable controller system having multiple modules housed in a single chassis and having communication links with I/O cards housed in remote racks for background purposes.

Referring now to FIG. 1, a programmable controller system 10 is be housed in a chassis or rack 12 which includes a series of slots that receive a plurality of printed circuit board modules. These functional modules connect to a mother board which extends along the back surface of the rack 12 to provide a system backplane 11. The backplane 11 comprises a plurality of module connectors which are interconnected by a conductive pattern on the backplane which provide a series of signal buses (i.e. data, address, control buses) to which the modules connect. The rack 12 contains a power supply module 14, a "resource manager" or system controller module 16, a number of "local program execution" or processor modules 18 and a plurality of remote input/output (I/O) scanner modules 20, although only one processor module and one scanner module is required. The remaining locations in rack 12 are empty and the slots may be covered by blank plates pending the insertion of additional functional modules at these locations.

The remote I/O scanner modules 20 interface the controller system 10 to external remote I/O racks 17 via serial I/O data links, such as a communications network 15. Each remote I/O rack 17 has a plurality of local I/O modules 19 which are coupled to individual sensors (inputs and actuators outputs) on the controlled equipment. The local I/O modules 19 may take many forms and may include, for example, D.C. inputs or outputs, analog inputs or outputs, and open or closed loop positioning modules. Remote I/O racks 17 also contain communications adapter modules 19' which control the transmission of data via the I/O network 15 between each I/O module 19 and a scanner module 20. The network 15 employs conventional packet communications network interface and communications technology.

The system controller 16 is connected through a cable 25 to a programming terminal 24, which is used to load user programs onto the programmable controller system 10 and configure its operation and which may also be used to monitor its performance. Terminal 24 comprises a personal computer programmed to enable the user to develop control programs on the terminal which are then downloaded into processor modules 18 on system 10. The system controller 16 may be also connected via a cable 26 to a local area network 28 over which it can also receive data and programming instructions, and can issue status information and report data to a host computer.

Different steps of a sequential function chart program may be assigned to different processor modules 18. The user control programs for each of the steps are stored in separate files in the local memory of the processor 18 to which the steps are assigned. The user control programs usually comprise conventional ladder logic industrial control programs although these programs could take any of a number of forms. Several user control programs representing different sequential function chart steps may be executed simultaneously on different processor modules 18. At other times a "background task," independent background, selectable timed interrupt or processor input interrupt program may be executed on processor module 18 while another processor module 18 executes a user control program.

During the course of carrying out a user control program processor module 18 reads input data from input image tables in one or more of I/O scanner modules 20 receiving data from racks 17. As called for by the program instructions processor module 18 writes output data to the output image tables in one or more of the I/O scanning modules 20 transmitting data to racks 17 that service the output devices being controlled by the program. Access to the I/O tables on the modules 20 is obtained via communications over the system backplane 11 of the system rack 12. When a processor module 18 completes a sequential function chart step, it sends a command over the backplane 11 to the appropriate processor module or modules 18 containing the next step or steps to be executed. The command identifies the next step or steps and instructs the processor modules 18 to begin execution.

Figure 2:
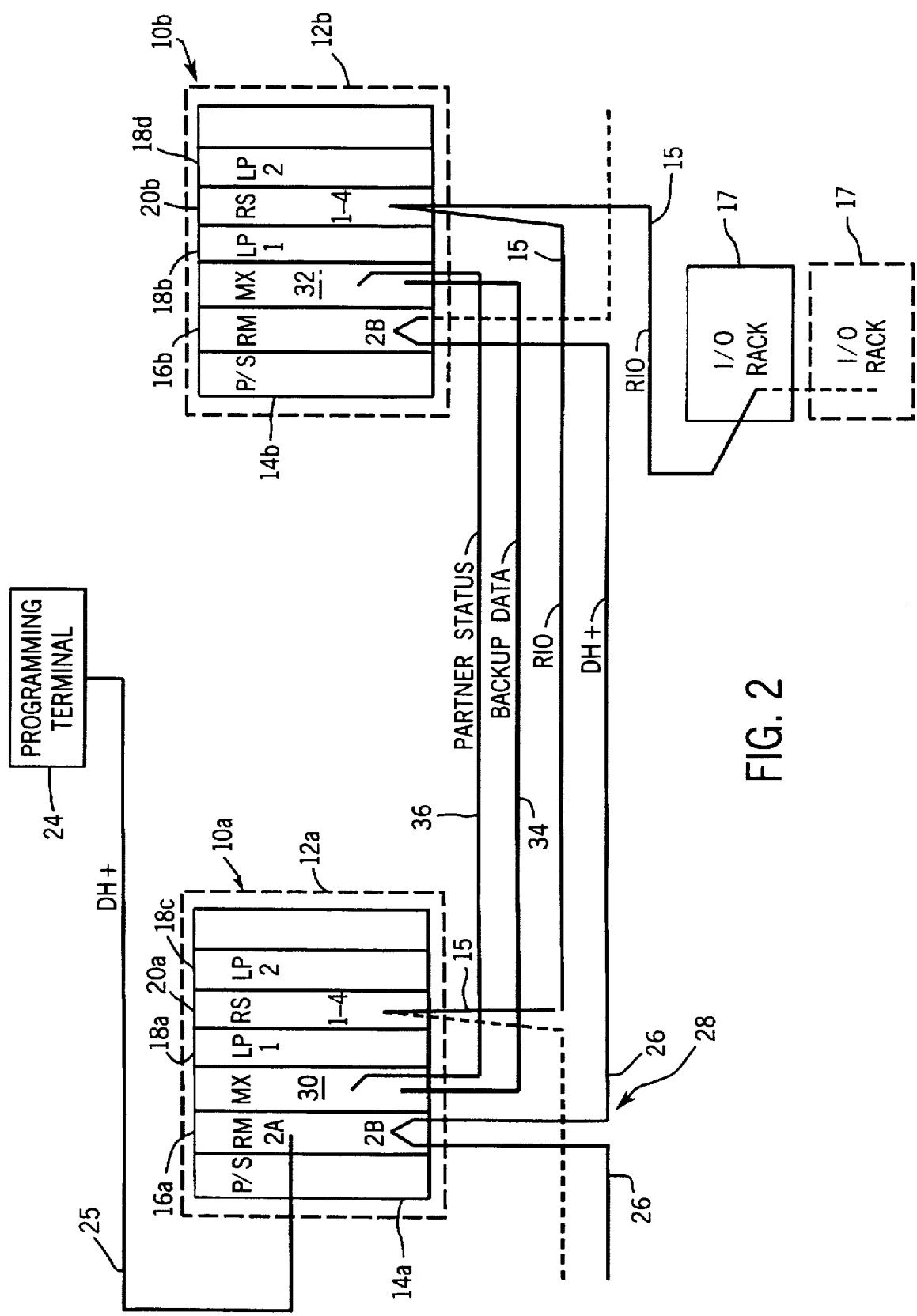
FIG. 2 provides a block diagram view of a backup system including two complete programmable controller systems each having multiple modules housed in separate chassis which are linked together for backup purposes in accordance with the present invention.

Referring now to FIG. 2, the present invention constitutes a primary programmable controller system 10a and a secondary or back-up programmable controller system 10b which are housed in separate racks, represented by dashed lines. 12a and 12b, respectively and which include sets of redundant hardware modules. The primary programmable controller system 10a includes power supply (P/S) module 14a, system controller (RM) module 16a, local processor (LP) modules 18a and 18c, remote scanner (RS) module 20a and a special backup (MX) module 30. The secondary programmable controller system 10b includes power supply (P/S) module 14b, system controller (RM) module 16b, local processor (LP) modules 18b and 18d, remote scanner (RS) module 20b and a special backup (MX) module 32. The serial I/O network 15 connects the remote I/O racks 17 to both of the remote scanner modules 20a and 20b in the primary and secondary systems, respectively. The communications cable 26 connects both of the system controller modules 16a and 16b onto the local area network 28. The programming terminal 24 may be used to load programs into programmable controller system 10a by way of system controller module 16a. The backup modules 30 and 32 are connected by a high speed data transfer (Ethernet) link 34 by means of which backup data may be crossloaded between the controller systems 10a and 10b and by a set of "partner status" control lines 36 over which backup status information may be directed from one system to the other.

Figure 3:
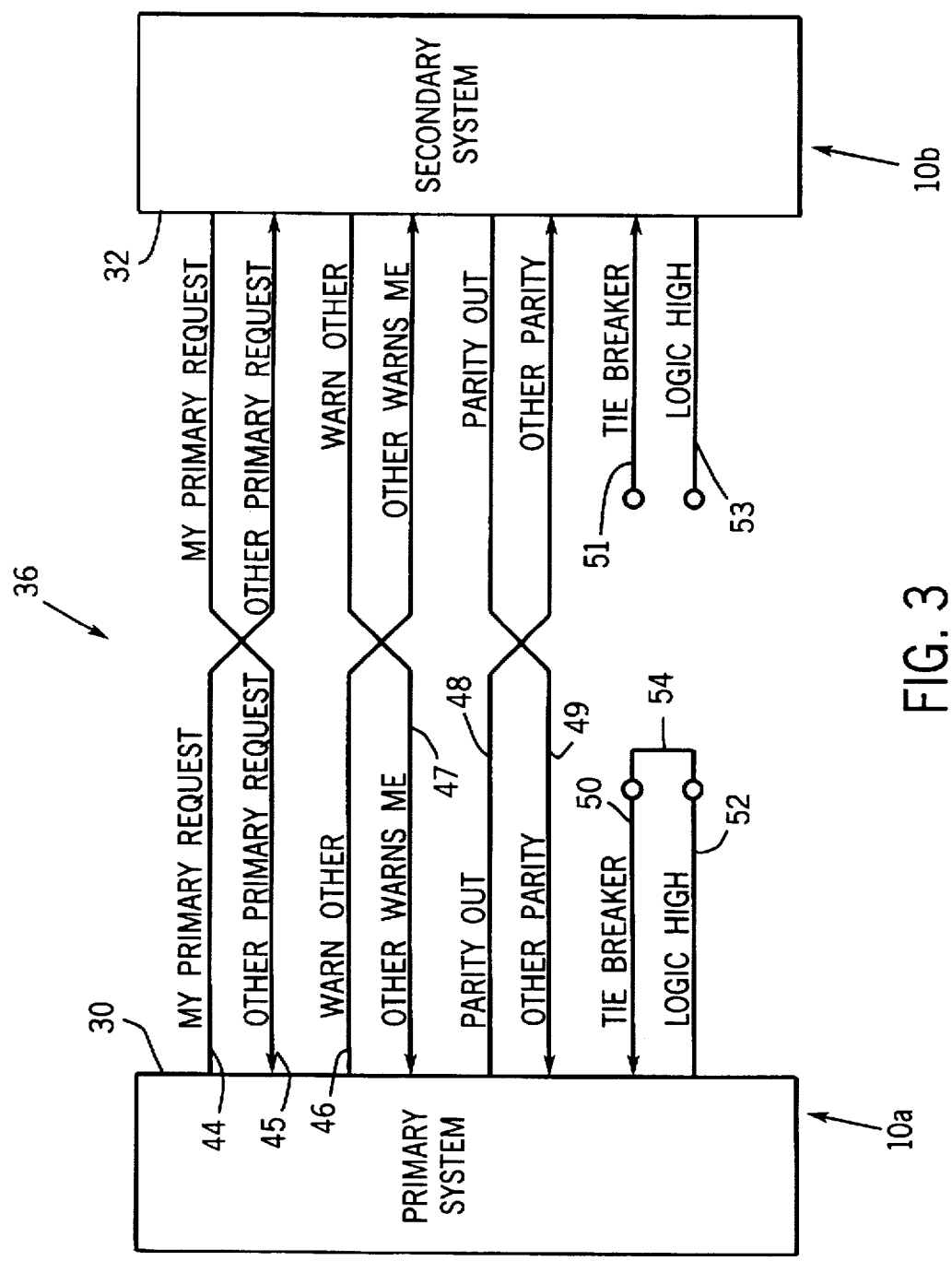
FIG. 3 provides a diagrammatic view of the partner status control lines connecting the backup modules in the primary and secondary programmable controller systems in accordance with the present invention.

Referring to FIG. 3, partner status control lines 36 include four pairs of signal lines 44–53 for transmitting complimentary signals between the two programmable controller systems 10a and 10b. Primary request control lines 44 and 45 carry the MY_PRIMARY_REQUEST/OTHER_ PRIMARY_REQUEST control signals between the two systems and have a central role in determining which of the systems will be the primary and which will be the secondary. The MY_PRIMARY_REQUEST signal 44 is used by controller system 10a to indicate when it is either operating as a primary system or is attempting to become a primary system at power-up. In the event both systems 10a and 10b try to become primaries at power-up due to simultaneous application of power, the TIE_BREAKER signal on tie-breaker control lines 50 and 51 is used to resolve the conflict at both the primary and secondary systems, respectively. Specifically, the tie-breaker control line 50 on one end of cable 36 is shunted to a terminal at line 52 by line 54 to provide a priority signal in the event of simultaneous MY_PRIMARY_REQUEST signals being transmitted by both systems. In this event, the system at the shunted end of cable 36 will become the primary. The warn other control lines 46 and 47 carry the WARN_OTHER/OTHER WARNS_ME signals, which are used for communicating fault notices whenever the primary system detects a fault in the secondary system or the secondary system detects a fault in the primary system. A primary system can thereby disqualify a secondary when it has detected a problem with the functioning of the secondary system. However, a secondary cannot disqualify a primary system from operation, but it can trigger diagnostics programs in the primary system for detecting whether it is subject to any operational faults. The parity control lines 48 and 49 carry the PARITY_OUT/ OTHER_PARITY signals which are used in detecting partner status cable faults and cable disconnects affecting the integrity of partner status lines 36 as well as partner absence or faults. In particular, cable transmission problems over partner status control lines 36 are diagnosed by tracking data transmissions and parity errors with respect to the signals transmitted over the other partner status control lines 36. Partner status control lines 36 are connected to and interact with identical state machines on backup modules 30 and 32 for interfacing with the programs and utilities running on the backup modules and performing the required primary determination, fault warning and cable integrity checking operations. Overall, partner status control lines 36 provide a hard-wired system for the immediate communication of "partner status" information in order to facilitate and coordinate backup operations.

Figure 4:
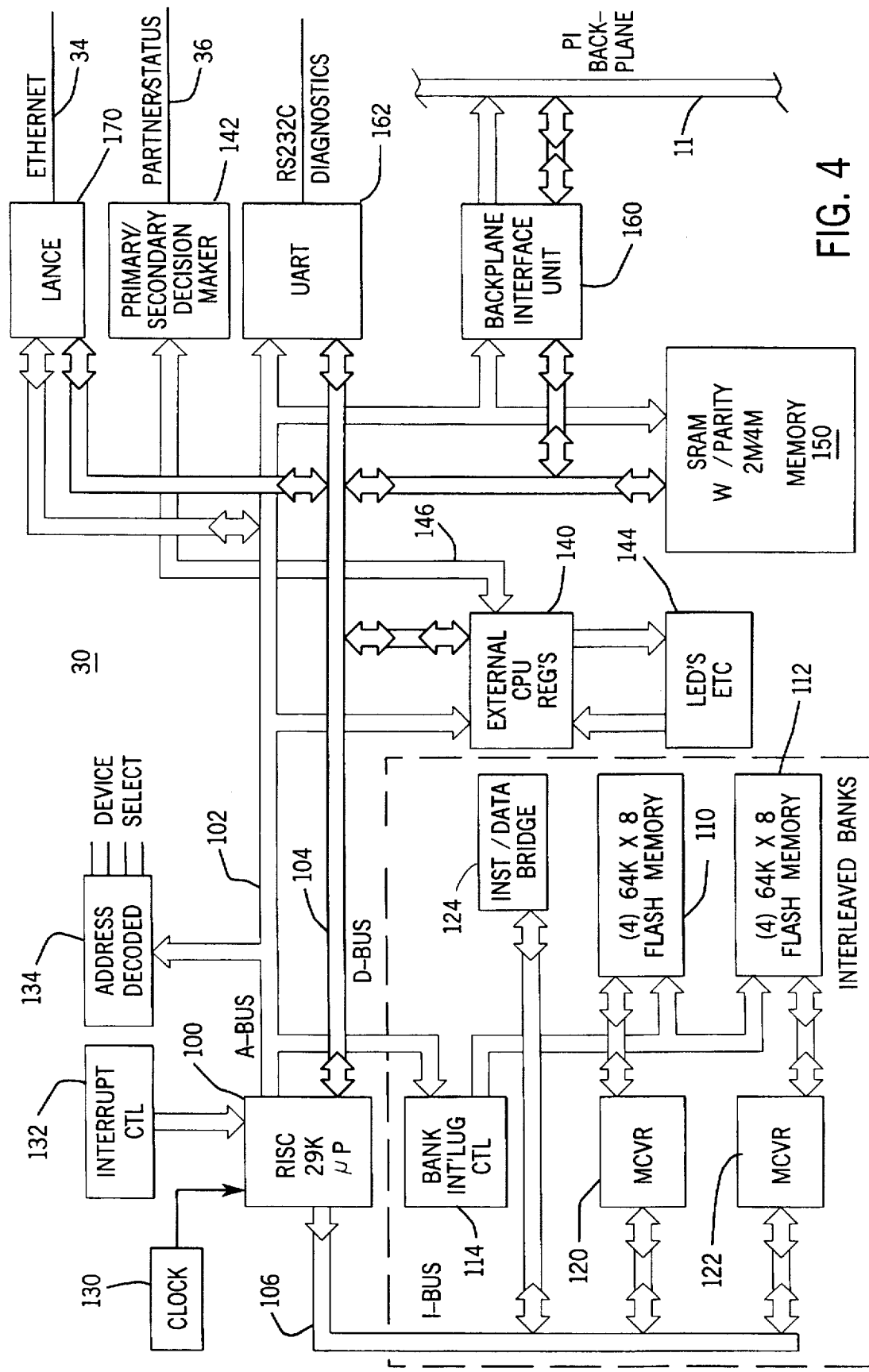
FIG. 4 provides a block diagram view of the hardware components for a backup module for use in linking primary and secondary systems coordinating and controlling backup activities in accordance with the present invention.

Referring now to FIG. 4, the backup modules 30 and 32 include a RISC processor 100 which communicates with other components by way of an address bus 102, a data bus 104 and an instruction bus 106. In particular, the program being executed by processor 100 is stored in flash memory banks 110 and 112 which form an interleaved unit under control of a bank controller 114. Specifically, instructions are passed to processor 100 over instruction bus 106 through transceiver units 120 and 122. Flash memory banks 110 and 112 may be reprogrammed through the use of an instruction/ data bridge unit 124 which enables data flow between data bus 104 and instruction bus 106. Additionally, RAM memory 150 provides overall operating memory for the processor 100 and the system associated with it. A clock unit 130 provides a clock timing signal to processor 100 and an interrupt control unit 132 enables interrupts of programs being executed by the processor. An address decoder 134 provides device select signals to the various components of the system in response to address words received over address bus 102. External CPU registers 140 enable LED signals to be provided on the front of the modules 30 and 32 in response to system status conditions and control the partner status communications lines 36 through a signal coupler 142 via a set of control lines 146. A backplane interface unit 160 controls communications between modules 30 and 32 and other modules in control systems 10a and 10b respectively and, more particularly, interfaces address and data buses 102 and 104 to the system backplane 11. A UART 162 converts parallel data signals into serial data signals and vice-versa allowing optional communications for diagnostic purposes and the like with auxiliary computer equipment over a separate serial data link. LANCE chip 170 enables an Ethernet communications port by interfacing address and data buses 102 and 104 to an Ethernet cable for establishing the high speed communications link 34 between backup modules 30 and 32.

At power-up, the programmable controller systems 10a and 10b undergo extensive qualification testing to assure that they are fully operational. In the case of a secondary system 10b, it is also tested to insure that it is fully compatible with its corresponding primary system 10a. In particular, the secondary system 10b must pass the following checks which are implemented by the backup modules 30 and 32 in order to become a qualified secondary for switchover purposes:

1. All secondary system modules must pass their own power-up checks, such as RAM tests, etc.;
2. the secondary system 10b must include all modules present on the primary system and be free of major communication faults;
3. all dip-switch and jumper settings on modules in secondary system 10b must match corresponding switch and jumper settings on corresponding modules in primary system 10a;
4. all user control programs in the processor modules 18 on the secondary system 10b must match the user control programs in the corresponding modules on the primary system 10a;
5. all configuration files in the modules on secondary system 10b must match the configuration files in the corresponding modules on primary system 10a;
6. all data table file structures in the modules on secondary system 10b must match the data table file structures in the corresponding modules on primary system 10a;
7. all data in the I/O image tables in secondary system 10b must match the data in the corresponding I/O image tables on the primary system 10a;
8. all data in all the tables in secondary system 10b must be no more than one scan older than corresponding data in primary system 10a; and
9. the states of all user program execution tasks in secondary system 10b must match the corresponding states of user program execution tasks in primary system 10a.

Once a secondary system 10b has become appropriately qualified, the synchronous cross-loading procedures which are hereinafter described are used to maintain the data structures in the secondary system 10b as up to date as possible in anticipation of a possible switchover.

In operation, programmable controller system 10a acts as a primary (although either of the systems 10a or 10b could act as the primary) and executes actual control operations with respect to the controlled equipment. Correspondingly, secondary system 10b acts as a backup system and is effectively offline (listen only mode) and is maintained on immediate standby status through the supply of backup data over high speed communications link 34 from the primary to the secondary system so as to keep the data structures in the secondary system as up to date as possible. In the event a non-recoverable critical fault such as a hardware watchdog timeout or a major fault such as an array index out of bounds which the user has designated as sufficient cause for switchover occurs in primary system 10a, primary system 10a takes itself offline and the secondary system 10b is so signaled over MY_PRIMARY_REQUEST control line 44 (it becomes non-asserted). Signal loss due to cable or power discontinconuity also triggers switchover. Thereafter, when properly qualified secondary system 10b assumes the role of the primary system in performing control operations while the former primary system 10a remains offline. Additionally, in the case of major faults the user is provided with other options whereby either a user furnished fault handling program can be run after fault occurrence or all I/O can be "frozen" pending manual intervention to address the fault. In any event, because data is promptly and continuously crossloaded over the backup communications link 34 the secondary system is prepared at any time to undertake control operations in a bumpless fashion so that process integrity is maintained.

Programmable Controller System Data Structures

The System Memory Listing details the data structures within the main system memory within system controller module 16 that are subject to crossloading:

---
SYSTEM MEMORY LISTING
---
A) DIRECTORY DATA
B) SYSTEM STATUS FILE
   1) USER SELECTABLE FEATURES
   2) REALTIME SYSTEM CLOCK
   3) ERROR/FAULT REPORTS
   4) ACTIVE MODULE LIST
   5) MODE INFORMATION
C) SYSTEM DATA TABLE
   1) DATA SHARED BETWEEN MODULES
   2) COMMUNICATION BUFFER
      HOST DATA
      USER INTERFACE DATA
      PEER TO PEER COMMUNICATION DATA
   3) SYSTEM COUNTERS & VARIABLES
   4) USER DEFINED PROGRAM DATA
D) SYSTEM SUPPORT FILES
   1) SOURCE INFORMATION FOR SEQUENTIAL FUNCTION CHARTS
   2) SIMULTANEOUS COUNTERS FOR PROGRAM BRANCHES
   3) MODULE STATUS (BACKUP)
   4) COMMUNICATION PARAMETERS

The system memory contains a first file designated in the system memory listing above as directory data (A), which is a directory of the other files stored in the system memory. The remaining memory is divided into a system status file (B), system data table (C) and a set of system support files (D).

System status file (B) contains data relating to the configuration of the entire programmable controller system 10. In particular file (B) includes information identifying the various user selectable features of the programmable controller system that have been enabled by the system operator and system status data indicating when the system is operational as a primary or as a secondary. Real time clock data regarding the time of day, month, day and year are also included in this portion of the system memory. Additionally, digital flags indicating the occurrence and type of various faults and errors, as well as pointers indicating the program instruction being executed at fault occurrence are stored in this section. Another section of the system status file also lists the number and type of all the active modules on the system as well as the relative module number and address pointers necessary for communications to access each module. A further section of the system status file includes information on the operational mode (e.g. run, test, program, etc.) of the system.

System data table (C) contains a first section including data that is required for use by more than one module and therefore must be accessed by more than one of the modules on the system 10. In a second section, memory space is allocated within system data table (C) to store message data that has been received or that will be transmitted via the system controller's communication ports. In a third section, system data table (C) also contains the value of various system counters and variables which are either used by system controller 16 or which are commonly used by other modules such as processor modules 18 or scanner modules 20. The final section within system data table (C) is a space allocated for special user defined data relating to programs that the user has loaded into the system 10.

Another area of the system controller's main memory is dedicated to system support files (D) as shown in the table above. These files include the source program information for the sequential function chart program. This function chart information is employed during programming to generate data which is used to direct the operation of processor modules 18. Additionally, system support files (D) contain simultaneous counters for execution of various branches of the sequential function chart program. In a final section of the system support files (D) status information for modules not having a local non-volatile memory storage is replicated in order to retain information after a power shut-down.

The Processor Memory Listing shown below details the data structures of the processor memory in processor module 18 which are subject to crossloading:

---
PROCESSOR MEMORY LISTING
---
A) STATUS DATA
B) DATA TABLE
   1) COUNTERS AND TIMERS
   2) INTERMEDIATE VALUES
C) PROGRAM AREA
   1) PROGRAM FILES
      USER CONTROL PROGRAMS
      INDEPENDENT BACKGROUND PROGRAMS
      INTERRUPT SUBROUTINES
   2) FUNCTION CHARGE DESCRIPTOR SUPPORT FILES

As shown, the processor memory includes section (A) which contains status information regarding the operational state of the module and section (B) which contains a data table which includes memory locations for various counters, timers and intermediate computation values. The largest area of processor memory is program area (C) which is devoted to storing control program files, including user control programs, independent background task programs and various interrupt routines to be executed by the modules 18. In order to properly carry out the user control programs, support files comprising function chart data, sometimes referred to as "descriptors" are also contained within program area (C).

The Scanner Memory Listing shown below details the data structures for the scanner memory in an I/O scanner module 20 which are subject to crossloading:

---

SCANNER MEMORY LISTING

---

A) INPUT DATA IMAGE TABLE
   1) INPUT IMAGE
   2) INPUT FORCED ON
   3) INPUT FORCED OFF
B) OUTPUT DATA IMAGE TABLE
   1) OUTPUT IMAGE
   2) OUTPUT FORCED ON
   3) OUTPUT FORCED OFF
C) COMMUNICATIONS DATA
   1) ADAPTER STATUS
   2) BLOCK TRANSFER CONTROL
   3) DATA BLOCK STORAGE

---

The scanner memory includes I/O image tables for the input devices (sensors) and output devices (actuators) serviced by module 20. With reference to the Scanner Memory Listing table shown above, the input data image table corresponds to input status data from input devices connected to the I/O racks 17 serviced by the I/O scanner module 20 and consists of three separate sections. The first section represents the actual states of the various sensing devices. Information relating to the input locations that are forced on and off is contained in second and third sections, respectively, which reside nearby.

The output image table (B) corresponds to output status data for output devices connected to the remote I/O racks 17 serviced by the I/O scanner module 20 and consists of three separate sections. The first section represents the actual states of various output data corresponding to output devices. Information relating to output locations that are forced on and off is contained in second and third sections, respectively, which reside nearby.

The data structure in the memory of the I/O scanner module 20 also includes a third section (C) which contains data regarding the status of the communication adapter in each of the remote I/O racks 17 serviced by module 20. This data is used to control the transfer of information over network 15 with the remote I/O racks.

Although the state of most of the sensor and operating devices may be represented by a single bit, certain devices, such as position sensors and analog devices produce or require information that comprises digital words. This data may be transmitted between remote I/O rack 17 and I/O scanner module 20 in data blocks. In particular, the I/O scanner module memory contains a section devoted to control information necessary to enable such block transfers of data. A companion section provides a memory area for the storage of actual blocks of data pursuant to the block transfer process.

Sequential Function Chart Structures

Figure 5:
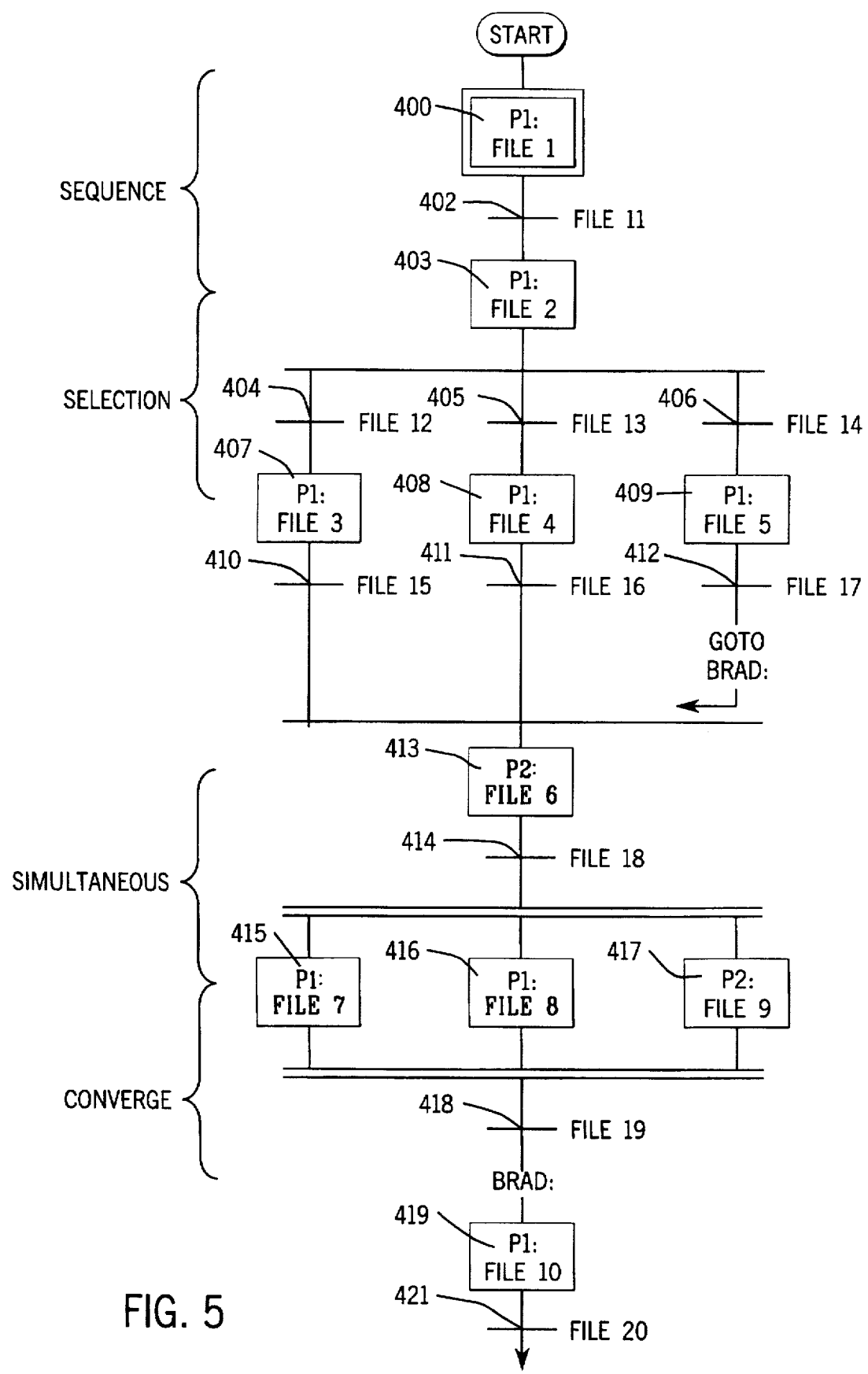
FIG. 5 provides a sequential function chart illustrating the structure and principles of sequential function chart programming for background purposes.

FIG. 5 provides a typical example of a sequential function chart and provides background relating to important types of program information which are subject to being crossloaded between systems. Each processing step of the function chart is designated by a rectangle that contains the file name for a user control program to be executed in that step. Each transition from one step to another is designated by a horizontal line with a file name indicated for the transition condition. In the present example programmable controller system 10 has two processor modules 18 which are designated P1 and P2 such as the modules 18a and 18c on system 10a. The control program for step 400 is contained in file 1 and is repeatedly executed by the first processor module P1 until a programmed condition is met. That condition is represented by transition 402 which is contained in file 11 immediately below box 400 in the function chart. Typically a transition is defined by a single rung in a ladder program which is executed on the same processor module (e.g. P1) as the step with which it is associated. When this rung is found to be true, the execution of the ladder program for step 400 ceases and the program execution advances to the next function chart step which in this case is step 403.

Following step 403 the program has three separate branches, only one of which is selected for execution depending upon a set of corresponding transition conditions. The first branch includes an initial transition 404 that is defined by the user control program contained in file 12 and processing step 407 defined by the user control program contained in file 3. Step 407 is followed by a termination transition condition 410 that is contained in file 15. Similarly, the middle branch includes an initial transition 405, a processing step 408 followed by a termination transition 411. The third and final branch consists of initial transition 406, a main processing step 409 and a termination transition 412. A GOTO statement follows transition 412 indicating that the program execution is to jump to the point in the program where the specified label (i.e. Brad) appears. In this case the program is to jump to function chart step 419.

Upon the completion of the previous function chart step 403 the conditions of the initial transitions 404–406 in each branch are sequentially examined. The first initial transition which is found to be true determines which of the three branches will then be executed. For example, when the condition defined by the user control program of transition 405 in file 13 is the first condition found true step 408 of the middle branch is executed. The completion of the user control program for step 408 is indicated by the termination transition 411 contained in file 16. When that transition becomes true, the program transfers to step 413 contained in file 6 which is executed on the second processor P2.

Once step 413 is completed as indicated by transition 414 contained in file 18, three processor steps 415–417 are concurrently executed. The first step 415 comprises the control program stored in file 7 which is executed on the first processor module P1. The program for step 416 in the second branch is contained in file 8 which is executed on the first processor module P1, while step 417 in the third branch contained in file 9 is assigned for execution to the second processor module P2. Because files 7 and 8 are both assigned for execution by the first processor module P1, the user control program contained in each of the files will be conventionally concatenated (i.e. strung together to run sequentially).

All three steps 415, 416 and 417 pass to single transition step 418 in which the program in file 19 is executed on the second processor module P2 following each scan of the user control program in file 9. When the transition 418 is true, the execution of each branch step ceases at the end of their current program scan. As noted above with respect to the data structure of the system controller 16, one of the system support files contains a memory area for the step counters of the simultaneous portions of the function chart diagram. One of these counters is loaded upon entry into the simultaneous section with the number of simultaneous processing steps in the construct. After the transition condition 418 is satisfied, this counter is decremented as each step 415–417 completes its program scan and comes to a halt. When the counter reaches zero and all of the simultaneous steps are completed, the transition to the next step 419 following the converge construct is enabled to occur.

The primary and secondary controller systems 10a and 10b can be configured for execution to begin at switchover either at the beginning step (top) of a sequential function chart program or at the steps last known to be active in the former primary system. Since the coordination of sequential function chart ("SFC") operations is a system-wide activity, the backup module 32 in the secondary system 10b is employed for centrally coordinating SFC switch-over when the primary and secondary are to be synchronized for program switch-over at the last known active steps. The processor modules 18a and 18c in the primary chassis 10a transmit data relating to the active steps in the sequential function chart to the backup module 32 over the high-speed data link 34 including data indicating the SFC steps they are preparing to execute, the active SFC steps on which they have completed pre-scans, the SFC steps on which they have completed first scans, and the SFC step transitions which have toggled from False to True upon the occurrence of each of these events. This information allows the secondary system 10b to begin control operations as a primary at switch-over at the last active sequential function chart steps with the backup module 32 in the secondary system 10b initializing the processor modules 18b and 18d in the secondary system 10b to begin execution at the appropriate sequential function chart steps.

Data Crossloading Procedures

Figure 6:
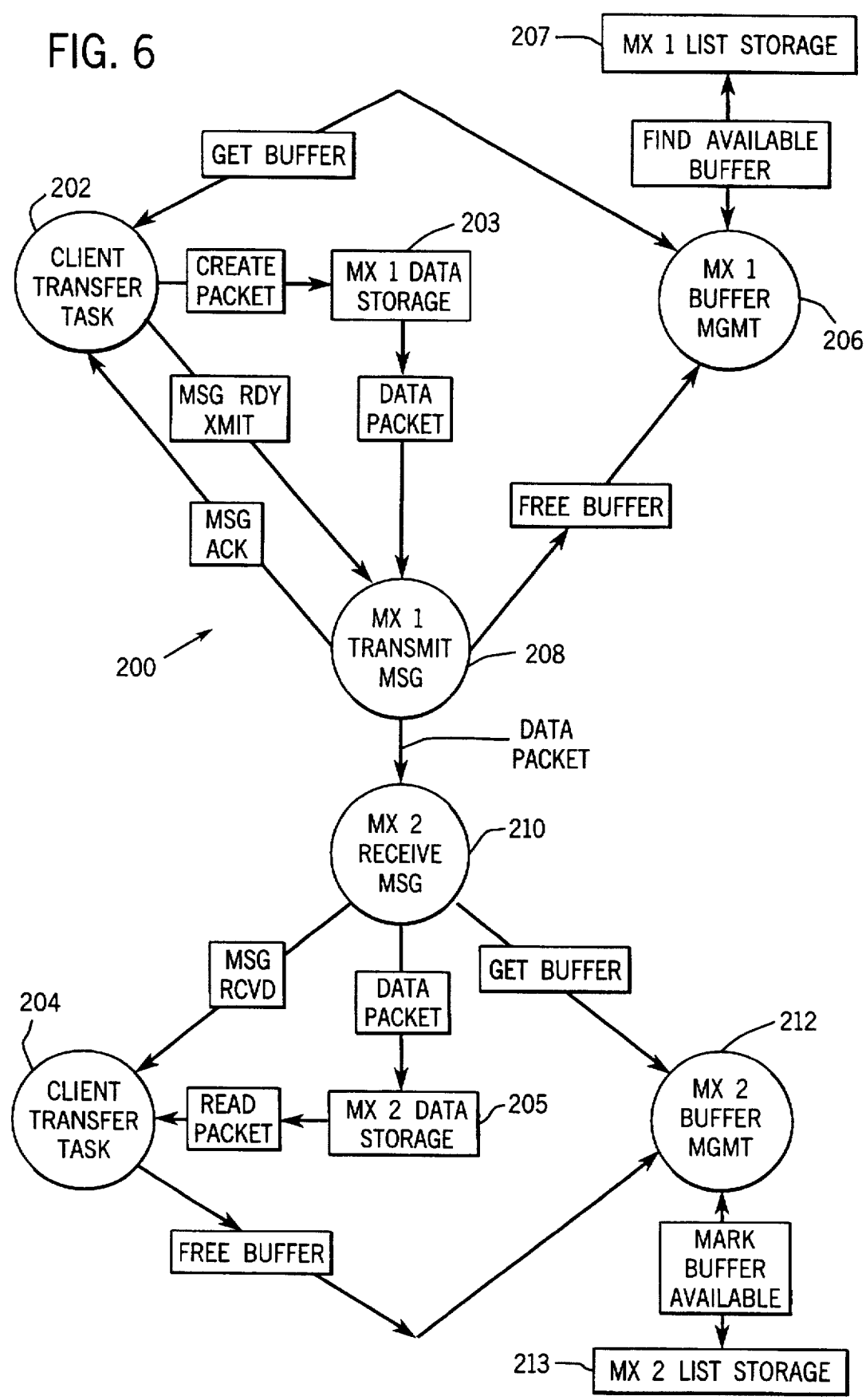
FIG. 6 provides a block diagram of the program tasks and objects involved with crossloading of data between primary and secondary controller systems in accordance with the present invention.

Referring now to FIG. 6, the data transfer system 200 between primary programmable controller system 10a and secondary programmable controller system 10b is described in terms of program tasks and program objects included within it. The client transfer task 202 represents any of a number of data module transfer tasks distributed among processor modules 18 on primary system 10a. Similarly, client transfer task 204 represents any of a number of data module transfer tasks distributed among processor modules 18 on secondary system 10b. For example, client transfer tasks 202 and 204 may correspond to program objects on local processor modules 18a and 18b which need to exchange sequential function chart program information relating to active steps. Alternately, client transfer tasks 202 and 204 may comprise I/O data objects on remote scanners 20a and 20b which need to exchange I/O image table information. More generally, client transfer tasks 202 and 204 are the sources and destinations of data packet messages which are transferred between systems 10a and 10b via backup modules 30 and 32 over high speed communications link 34. Although, one-way communications is shown between systems 10a and 10b, and the vast bulk of communications are one-way going from primary system 10a to secondary system 10b, communications from secondary system 10b to primary system 10a is also supported.

The operation of data transfer system 200 is explained below with reference to the transfer of a data packet type message between client transfer task 202 as a source and the client transfer task 204 as a destination. In particular, when the client transfer task 202 desires to transfer data it signals a buffer management object 206 on the backup module 30 to have a memory buffer allocated for receiving a message from the client transfer task 202. In response, buffer management object 206 checks a linked storage list 207 for memory buffer availability and replies back to client transfer task 202 with a free memory buffer by its head and tail addresses when a buffer is available. However, when no memory buffers are available buffer management object 206 will reply back to client transfer task 202 with that information. On the other end, client transfer task 202 will either wait until a memory buffer becomes available or it will perform other operations and check for memory buffer availability at another time. When the client transfer task 202 is notified that a memory buffer is available, it will copy a message into the buffer 203 along with attribute data indicating the message's priority, length, source address and destination address by priority mail over system backplane 11. Client transfer task 202 then signals transmit message object 208 on backup module 30 that a message is ready for transfer while at the same time providing information as to the location and identity of the memory buffer in which the packet message is residing as assigned by buffer management. Once transmit message object 208 receives a signal that the packet message is ready to be transmitted from client transfer task 202, the memory buffer is added to its transmit queue. (Please note that for the sake of simplicity in the following explanation a data packet or message is now considered to be synonymous with the memory buffer in which it resides and is therefore sometimes referred to as a "buffer".)

The transmit queue is a first in-first out arrangement with preemption. When the memory buffer is indicated as containing a high priority message in accordance with its attribute data supplied from the task 202 the message is placed in front of other normal priority messages for immediate transmission across high speed communications link 34 to secondary system 10b. High priority buffers are placed in a first-in first-out queue ahead of any normal priority buffers which are also placed in a first-in first-out queue of their own.

In due course the transmit message object 208 performs driver functions required for the transmission of the packet message from the memory buffer over the communications link 34 for processing by a receive message object 210 on backup module 32 in secondary system 10b. Once a message has been successfully transmitted transmit message object 208 signals buffer management object 206 that the memory buffer location is free to be used for storing a different message. When receive message object 210 is notified about the receipt of a message it signals a buffer management object 212 that it needs to obtain a memory buffer to store the transmitted message. In response, buffer management object 212 checks a linked storage list 213 and replies back to receive message object 210 with information identifying a free memory buffer on module 32 by its head and tail addresses. Once the message including its attributes is copied to the memory buffer 205 provided by buffer management object 212, receive message object 210 looks at the destination address for the message to determine which hardware module in its system should be notified that a message has been received for transfer over to it. The destination module is responsible for handling the transfer of the message by priority mail over system backplane 11. Once the message is transferred to the destination module, a message dispatcher residing on each hardware module and contained in each module system data transfer task looks at the destination address in the message and determines the particular client transfer task on the module, in this case client transfer task 204, which will process the data contained in the message. The message is then added to the message queue for the client transfer task and the client task 204 processes the data in the message according to its own requirements. Once the message has been processed, the client transfer task 204 directs buffer management to free the memory buffer for further use. It should be noted that messages may also be transferred in the reverse direction from the client transfer task 204 in the system 10b to the client transfer task 202 in the system 10a by way of the transmit message and received message objects not shown in FIG. 6 in the same fashion as explained above.

Data transfer system 200 enables rapid and accurate transfer of the data structures in the modules 16a, 18a, 18c and 20a on a prioritized basis from the primary system 10a to corresponding modules 16b, 18b, 18d and 20b on secondary system 10b. The prioritization of data transfer functions as summarized in the CROSSLOAD TABLE below allows for especially effective transfer of key data for intersystem synchronization.

| | CROSSLOAD TABLE | |
|---|---|---|
| DATA | CROSSLOAD TYPE | LINK PRIORITY |
| I/O Image | Background | High |
| Step Status | Synchronous | High (Acknowledged) |
| Mode Status Changes | Synchronous | High |
| Local Data Changes | Synchronous | Normal |
| System Data Changes | Synchronous | Normal |
| Local Data | Background (Timed) | Normal |
| System Data | Background (Timed) | Normal |
| IBP State Changes | Synchronous | High (Acknowledged) |
| Clock Data | Synchronous | High Priority |

"Synchronous crossloading" of control data upon data changes allows an advanced degree of synchronization to be maintained between the systems 10a and 10b during control operations.

Referring still to FIG. 6 data transfer system 200 provides further flexibility in allowing the transmission of messages over the high speed communications link 34 to be acknowledged by transmit message object 208 back to the client transfer task 202. When especially important data is crossloaded from the primary system to the secondary system, program objects on processor modules 18a and 18c corresponding to the transfer tasks may delay further operations until acknowledgment of the data transmission of data is received from the receive MSG object 210 in the secondary system 10b. In this manner systems 10a and 10b can proceed with assurance that certain messages have been sent and that the primary and secondary systems are synchronized. This feature is important in achieving sequential function chart program synchronization.

When the user configures the systems for sequential function chart program synchronization, program step information is "synchronously crossloaded" from processor modules 16, 18 and 20 in the primary system 10a to the corresponding modules in the secondary system 10b as each step of the sequential function chart programs are executed on the processor modules of the primary system so that the secondary system is always aware of the state of all "active" sequential function chart steps which primary system 10a is executing. Likewise, whenever conditions for transition between sequential function chart steps are fulfilled, this information is immediately transferred on a high priority basis using data transfer system 200 from the processor modules in primary system 10a to secondary system 10b. During this time primary system 10a is delayed from proceeding with further steps in the sequential function chart program until the processor module in primary system 10a receives an acknowledgment from transmit message object 208 on its backup module 30 that the program step information has been transmitted to secondary system 10b. Accordingly, when primary system 10a crashes secondary system 10b can proceed with the sequential function chart program at the correct next sequential step and therefore provide a bumpless transition between primary and secondary systems.

Timely crossloading of input and output image information from primary system 10a to secondary system 10b is also important to the performance of the backup system of the present invention. To achieve timely crossloading input and output (I/O) image tables of remote scanner modules 20a and 20b comprise blocks of memory having relatively small sections containing active inputs and active outputs from the remote I/O devices being handled by the scanner modules. The group and rack numbers for the remote I/O devices delimit sections of the I/O image tables which may contain active input or output data. In order to keep the I/O data in both the primary and secondary systems as up to date as possible at all times this information is "background crossloaded" every 40 milliseconds from primary system 10a to secondary system 10b using data transfer system 200. Along with normal crossloading I/O data between the primary system 10a and secondary 10b an additional mechanism was developed to allow the Active Input Data to be received by the secondary system 10b off of the communication network 15. In particular, scanner 20a transmits out Active Output data on network 15 to devices 17 and receives back Active Input data back from devices 17 on network 15. At the same time Scanner 20b "listens" on network 15 to the Active Inputs being sent from devices 17 to primary system 20a and loads the Active Inputs into I/O image table in secondary system 10b. This feature is referred to as "Listen Only I/O".

I/O data containing Active Inputs crossloaded from system 10a do not overwrite the Active Inputs being loaded into system 10b via the Listen Only I/O feature. To accomplish this, a data table is implemented in the secondary scanner 10b, with 1 data bit being reserved for every rack, group and rack size combination of devices 17 that may reside on the network 15. When scanner 20b "hears" inputs from a device 17 with a particular rack and group on network 15, the scanner sets a bit in the table for every quarter racks worth of I/O that are contained within the device 17. When the crossload task within scan 20b receives a crossload of I/O data from the primary system, it checks this table for each quarter rack of input data in the crossload, before copying the data into the Input Image of scanner 20b. After all of the crossloaded Input data has been handled in this fashion, the crossload task clears all bits in the entire table. This mechanism allows the crossload task to update the Input Image in scanner 20b for active racks, if there have not been any inputs read from network 15 for the active racks since the last I/O data crossload. This assures that by either crossloading or "listening" on the network 15 the secondary scanner 20b has the freshest Input Image at any particular time.

On-Line Editing Procedures

Referring now to FIG. 2, the backup system of the present invention also allows for on-line editing through the use of a programming terminal such as terminal 24 connected to the system controller 16a or on the basis of edit commands directed over the network 28. Edit commands which are received by primary system 10a are automatically sent to secondary system 10b so that edits occur concurrently in the memory data structures of both systems. Editing is done in both systems in progressive stages so that if either system is incapable of completing the edit the edit request is rejected. Further, systems 10a and 10b are configured so that if switchover to the secondary system from the primary system occurs while an edit is in progress the differences between the programs in the primary and secondary systems are "cleaned up" to eliminate the possibility of an edit occurring in a primary system and the new program executing in the primary system before switchover to the secondary system running under the old version of the program.

Figure 7:
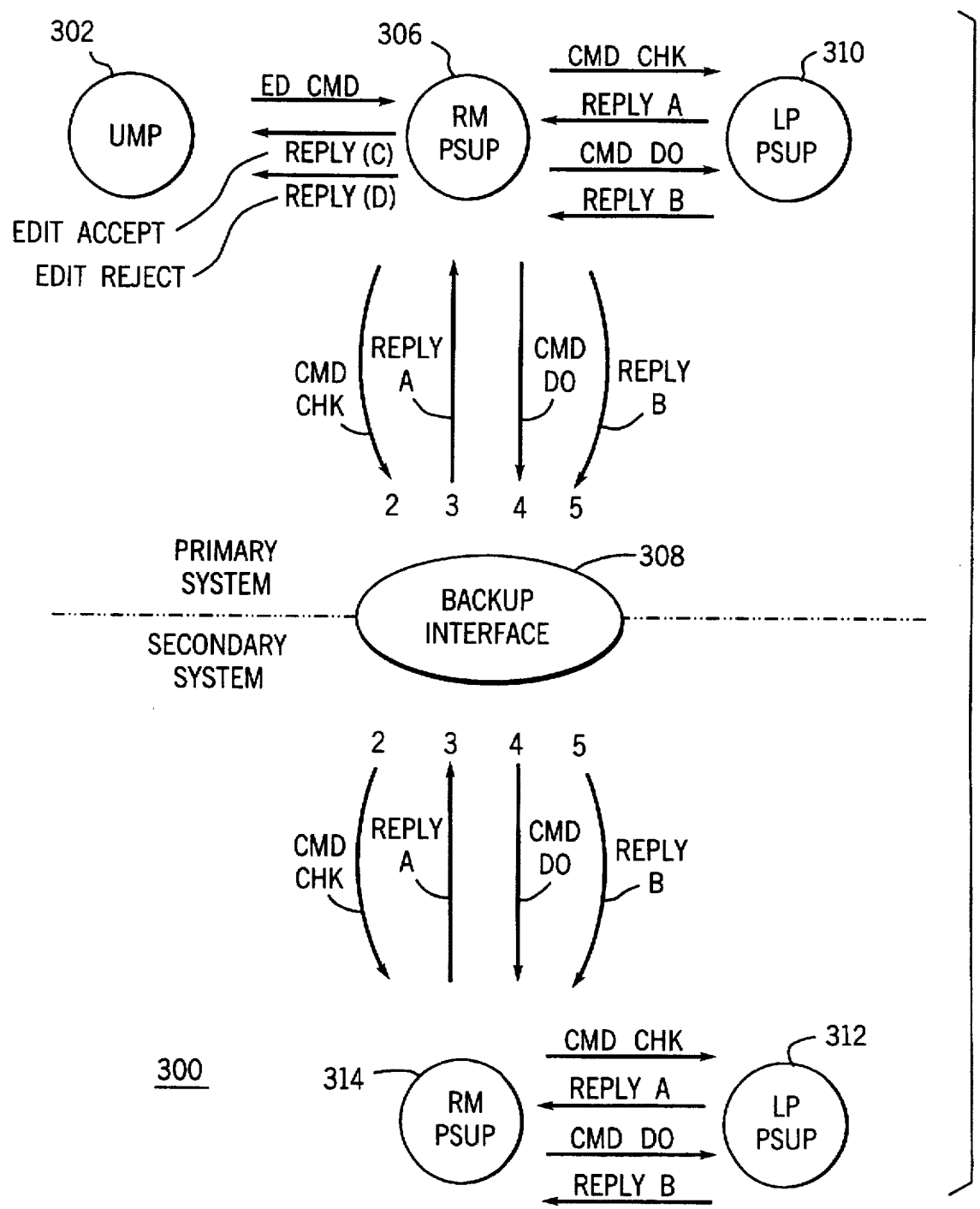
FIG. 7 provides a block diagram view showing program objects and tasks associated with on-line editing of control programs showing messages exchanged between these objects and tasks pursuant to on-line editing functions in accordance with the present invention.

Editing system 300 (FIG. 7) includes an unsolicited message processor (UMP) object 302 resident on system controller module 16a that processes messages from programming terminal 24 and transfers the same into appropriate destinations on the other modules within system 10a. When commands are received for editing files containing ladder programs and the like they are transferred by the unsolicited message processor object 302 to the program support object 306. After receiving a program editing command the system program support object 306 sends command check messages to system program support objects 310 and 312 on the appropriate local processor modules 18a and 18b on which the program to be edited resides in both the primary and secondary systems 10a and 10b, respectively. In the primary system 10a this command check message can be sent over the system backplane as a priority mail message. However, the command check message destined for the secondary system 10b must be delivered by way of the backup interface 308 formed by backup modules 30 and 32 and their associated communication objects including data transfer system 200. Further, this message must proceed by way of the program support object 314 on system controller 16b in secondary system 10b.

In response to command check messages, program support objects 310 and 312 on the local processor modules 18a and 18b in the systems 10a and 10b, respectively, verify that memory space is available for the editing change, that the edit operation is the only edit in progress and that the edit is compatible with the present program configuration in the processor modules in which it is to take place. Program support objects 310 and 312 then report back to system program support object 306 on system controller 16a with a corresponding reply message (A) indicating whether the editing changes can be successfully implemented on both the primary and secondary systems 10a and 10b. When the changes cannot be successfully implemented on both systems then the edit is rejected and an "edit reject" reply message (D) is sent back to the programming terminal 24 by way of unsolicited message processor object 302.

On the other hand, when reply message (A) from the program support objects 310 and 312 on local processor modules 18a and 18b indicates that an edit can be successfully implemented in both systems 10a and 10b, "command do" messages (CMD DO) including the edit data are sent to program support objects 310 and 312 by system program support object 306. This message is directed through program support object 310 by way of system backplane 11 in primary system 10a but must pass through backup interface 308 and program support object 314 on system controller 16b in secondary system 10b in order to reach program support object 312 in the secondary system. The editing command is then implemented in the programs within processor modules 18a and 18b.

When the edit to be implemented is a command for adding program logic such as a ladder rung, the "command do" message comprises three separate messages which proceed sequentially from system program support object 306 to program support objects 310 and 312. The first "command do" message opens up new memory space for the program change (e.g. into which a new ladder rung may be inserted). The second "command do" message actually adds the new program logic to the newly opened memory location and may consist of a plurality of like commands for large edits. The last "command do" message closes any memory gaps which may be remaining after the program logic is added and signifies completion of the function. When switchover takes place during an on-line edit that adds program logic as described above, program support object 312 in secondary system 10b responds by querying the status of the edit process. When the program logic has been successfully added then program support object 312 automatically resolves any memory gaps which may remain. On the other hand, when the program logic has not been fully added, program support object 312 automatically reforms the memory to its original configuration so that the edit is rejected. Through this procedure the program code is cleaned up if a switchover takes place during on-line editing for program logic additions.

Once any on-line edit is successfully completed the system program support objects 310 and 312 on the local processor modules 18a and 18b send a reply message (B) back to program support object 306 on the system controller in primary system 10a to acknowledge a command completion. The system program support object 306 on system controller 16a in turn sends an "edit accept" reply message (C) to the unsolicited message processor object 302 indicating that the edit command has been successively implemented so that unsolicited message processor object 302 can confirm this event back to programming terminal 24.

We claim:

1. A backup system for use with a first programmable controller system including a first remote scanner module and a first processor module mounted in a first rack having a first backplane for facilitating communications between said modules, said backup system comprising:

a) a first backup module mounted in said first rack having a first high speed data communications port;

b) a second programmable controller system including a second remote scanner module and a second processor module mounted in a second rack having a second backplane for facilitating communications between the second modules;

c) a second backup module mounted in said second rack having a second high speed data communications port connected to said first high speed communications port to form a high speed communications link between said racks; and d) means for synchronously crossloading information between the modules in said first rack and the modules in said second rack on a prioritized basis including:

i) means for prioritizing the crossloading of information between said modules over said communications link so that program step data for use in program synchronization and I/O data is passed over said link on a high priority basis before other types of data; and ii) means for triggering the synchronous crossload of program data from said first processor module from said first remote scanner module upon changes in said data.

2. The backup system of claim 1, further comprising:

e) means for acknowledging the transmission of said program step data for use in program synchronization from said first high speed data communications port to said second high speed data communication port back to the module on which it was generated;

f) means for delaying the execution of program steps at said first processor module until an acknowledgment is received that a crossload of program step data for use in program synchronization has occurred from said first high-speed communications port to said second high speed communications port.

3. The backup system of claim 1, further comprising:

a second communications port connecting said back-up system to remote I/O devices via a communications network; means for conducting listen only I/O in said backup system when said backup system is not operating as a primary system.

4. The backup system of claim 3, further comprising means for identifying when backup system I/O data for a particular device has been modified via listen only I/O over said communications network between first and second successive crossloads; and means for preventing crossloading of I/O data for said particular device when said backup system I/O data for said device has been modified prior to said second crossroad.

5. A method of backing up memory data structures from a primary programmable controller system to a secondary programmable controller system using a high speed communications link between backup modules on each of said systems, comprising the steps of:

on a prioritized basis synchronously crossloading mode change data and program step change data immediately whenever such changes in such data occur;

delaying program step changes until the crossloading of corresponding step change data is acknowledged by a backup module; and background crossloading system data tables and files, local processor data tables and files and I/O data tables on one or more periodic bases.

6. The method of claim 5, further including the step of:

qualifying said secondary system for backup operations by checking that said primary and said secondary system have virtually identical modules, application control programs and data structures.

7. The method of claim 5, further including the step of:

concurrently editing program steps on said primary and secondary systems in response to edit commands by delaying the implementation of the edit until the execution capability for each edit command in each system is acknowledged by both said systems.

8. A tightly coupled process for communicating backup information between source client tasks on a primary controller system including a first backup module and destination client tasks on a secondary controller system including a second backup module using a high speed communication link between said modules, comprising the steps of:

transferring packets of data to be transmitted from source client tasks on modules in said primary system to said secondary system into identified buffer memory locations on said first backup module;

passing information identifying said packets and their buffer locations to a message transmission object for queuing and processing outgoing packets and interfacing with a communications driver for said link;

transmitting said packets using said communications driver over said link to buffer memory locations on said second backup module on a prioritized basis;

passing information identifying said packets and their buffer locations to a message receipt object for queuing incoming packets and interfacing with destination client tasks; and transferring said packets of data to destination client tasks on modules in said secondary control system.

9. The process of claim 8, further including the steps of acknowledging the transmission of certain program step data packets over said link to selected source client tasks and delaying corresponding program steps from executing further until the transmission of said packets is acknowledged.

10. A method of performing on-line editing of control programs in a programmable controller system including a first processor module and a second processor module used for backup purposes, said method comprising the steps of:

a) generating a program edit command at a central program object adapted for implementing program edit commands;

b) generating first and second command check messages at said program object and forwarding these messages to said first and second processor modules for signaling said processors to verify their capabilities for concurrently executing said edit command;

c) having said processor modules each check their capabilities for executing said edit command in response to said command check messages;

d) generating first and second command check reply messages at said first and second processor modules for indicating the capabilities of said first and second processor modules to execute said edit command and forwarding these reply messages to said central program object;

e) halting the further implementation of said edit command at said program object when either of said command check reply messages indicates that the edit command cannot be executed;

f) generating first and second command do messages at said program object including one or more parts for signaling said processor modules to execute said edit command and forwarding these messages to said first and second processor modules; and g) having said processor modules execute said edit command in response to said command do messages.

11. The method of claim 10, further including the step of:

generating first and second command do reply messages at said first and second processor modules for indicating whether the edit command was successfully executed at said first and second processor modules and forwarding these messages to said central program support object in order to acknowledge edit execution.

12. The method of claim 10, further including the step of:

rejecting said edit command and reforming any memory changes actuated by said edit command at a processor module when backup switchover takes place during an editing process for adding program logic.

* * * * *